(12) United States Patent
Alawieh et al.

(10) Patent No.: US 12,025,724 B2
(45) Date of Patent: Jul. 2, 2024

(54) METHODS AND APPARATUSES FOR RTT MEASUREMENT PROCEDURE IN A TELECOMMUNICATIONS NETWORK

(71) Applicant: KONINKLIJKE PHILIPS N.V., Eindhoven (NL)

(72) Inventors: Mohammad Alawieh, Erlangen (DE); Niels Hadaschik, Erlangen (DE); Ernst Eberlein, Erlangen (DE); Norbert Franke, Erlangen (DE)

(73) Assignee: Koninklijke Philips N.V., Eindhoven (NL)

( * ) Notice: Subject to any disclaimer, the term of this patent is extended or adjusted under 35 U.S.C. 154(b) by 295 days.

(21) Appl. No.: 17/421,248

(22) PCT Filed: Jan. 10, 2020

(86) PCT No.: PCT/EP2020/050543
§ 371 (c)(1),
(2) Date: Jul. 7, 2021

(87) PCT Pub. No.: WO2020/144326
PCT Pub. Date: Jul. 16, 2020

(65) Prior Publication Data
US 2022/0146620 A1 May 12, 2022

(30) Foreign Application Priority Data
Jan. 10, 2019 (EP) ................................ 19151110

(51) Int. Cl.
*G01S 5/10* (2006.01)
*G01S 5/02* (2010.01)
(Continued)

(52) U.S. Cl.
CPC .............. *G01S 5/10* (2013.01); *G01S 5/0236* (2013.01); *G01S 5/14* (2013.01); *H04L 5/0051* (2013.01); *H04W 24/10* (2013.01); *H04W 92/20* (2013.01)

(58) Field of Classification Search
CPC . G01S 5/10; G01S 5/0236; G01S 5/14; H04L 5/0051; H04W 24/10; H04W 92/20
See application file for complete search history.

(56) References Cited

U.S. PATENT DOCUMENTS

2016/0195603 A1 7/2016 Li
2018/0098303 A1 4/2018 Zhang et al.
(Continued)

FOREIGN PATENT DOCUMENTS

| WO | WO 2014/036150 A1 | 3/2014 |
| WO | 2018016056 A1 | 1/2018 |
| WO | WO 2018/124675 A1 | 7/2018 |

OTHER PUBLICATIONS

3GPP TSG-RAN WG2 Meeting #104, "On Demand Transmission of PRS for NR", Nov. 16, 2018, Qualcomm Incorporated.
(Continued)

*Primary Examiner* — Wayne H Cai (57) ABSTRACT

The embodiments herein relate to a method for an RTT measurement procedure in a communication network, the method comprising: (701) setting a positioning mode; (702) identifying a number of neighboring radio base station, n-gNBs, based on at least one report from a at least one User Equipment, or from UE information based on at least one measurement performed by a serving radio base station, s-gNB, serving said UE; and (703) initiating configuration by: —acquiring capabilities of said at least one UE and capabilities from at said radio base stations, gNBs, —reporting by said at least one UE beam measurements for the n-gNBs from said at least one report; and
(Continued)

setting resources for the s-gNB and the n-gNBs. There is also provided a system and apparatuses in the form of a UE, a gNB and a location server.

11 Claims, 7 Drawing Sheets

(51) Int. Cl.
*G01S 5/14* (2006.01)
*H04L 5/00* (2006.01)
*H04W 24/10* (2009.01)
*H04W 92/20* (2009.01)

(56) References Cited

U.S. PATENT DOCUMENTS

2018/0343635 A1 11/2018 Edge et al.
2020/0119875 A1* 4/2020 John Wilson .......... H04B 7/088
2021/0185614 A1* 6/2021 Zhou ..................... H04L 5/0051

OTHER PUBLICATIONS

3GPP TSG RAN WG1 Meeting #95, "NR Beam Management Supporting Multi-gNB Measurements for Positioning", Nov. 12, 2018, Fraunhofer IIS, Fraunhofer HHI.

3GPP TSG-RAN WG2 Meeting #102, "Combined Downlink and Uplink NR Positioning Procedures", Nov. 16, 2018, Qualcomm Incorporated.

Translation of WO 2018/016056 A1, Published Jan. 25, 2018, Communication Device, Communication System and Delay Compensation Method, Takemoto, Yuta (Mitsubishi Electric Corporation).

3GPP TSG RAN WG2 Meeting @105bis, "NR DL and UL Positioning: RTT Procedure", Apr. 12, 2019, Fraunhofer IIS, Fraunhofer HHI.

International Search Report for PCT/EP2020/050543 from the International Searching Authority, European Patent Office, dated Feb. 21, 2020.

R1-1813583 "NR multi TRP beam management for TDOA positioning"; Nov. 12-16, 2018 3GPP TSG RAN WG1 Meeting #95 R1-1813583 Spokane, US, Nov. 12-16, 2018.

Qualcomm Incorporated, "Text Proposal for Clause 8 of TS 38.305", 3GPP Draft; R2-1711052_(TP For Clause 8 of 38305), 3rd Generation Partnership Project (3GPP), Mobile Competence Centre; 650, Route Des Lucioles, France.

* cited by examiner

METHODS AND APPARATUSES FOR RTT MEASUREMENT PROCEDURE IN A TELECOMMUNICATIONS NETWORK

TECHNICAL FIELD

The present disclosure relates to the field of telecommunications and in particular to methods and apparatuses for Round Trip Time (RTT) measurement procedure in a network.

BACKGROUND

Currently Enhanced Cell IDentification (ECID or E-CID) procedure signaling has to be performed one at a time for each User Equipment (UE) or eNodeB (eNB). The UE needs to be connected with the neighbouring radio base station in e.g. the third generation partnership project (3GPP). A radio base station is also known as a eNB or gNB depending on the radio access technology used in 3GPP. The UE needs to be assigned UpLink (UL) resources for transmitting and DownLink (DL) resources for measurements. A drawback with this approach is that it requires extra signaling when ranging with multiple base stations or gNBs.

The ECID method is also limited by the accuracy due to factors the quantization (with LTE (Long Term Evolution) sampling time) for the UE and eNB reporting. A device or UE or a network node (e.g. a gNB) capable of compensating the resulting errors may not profit from higher accuracy due to the limitations on the used positioning protocol such as the LPP or LTE Positioning Protocol.

ECID and Time Advance Distance Vector (TADV) type 1 procedure is also limited by the accuracy due to the quantization (with the LTE sampling time) for the UE and the eNB or gNB reporting Rx-Tx reporting, where Rx stands for receiving and Tx for transmitting.

The LTE positioning protocol has therefore limitation in that a device (or eNB or gNB) that is capable for compensating for the resulting errors due to sampling time in LTE, cannot profit from higher accuracy.

The concept for TADV does not foresee multiple devices, such as multiple UEs and gNBs, hence extra signaling for two way communication overhead is required when ranging with multiple base stations.

Current E-CID procedure signaling has to be employed one at a time for each UE or eNB Internal hardware delays add extra error and compensation. This puts limitation on the processing capacity and hardware capacity of the device.

As a result, signal overhead, delays and inaccuracies, when ranging with multiple devices or multiple base stations are experienced.

In the following the Round Trip Time (RTT) basic procedure is explained followed by the ECID TA (Timing Advance) type 1 procedure and the different limitations that these procedures have.

RTT Basic Procedure

RTT has the advantage that no synchronization is required between the infrastructure (or gNBs) compared with one way measurements like TDOA (Time Difference Of Arrival). This is achieved at the expense of extra signaling: For TDOA one-way transmission from the UE to multiple gNBs in Uplink or from multiple gNBs to UE(s) is sufficient to find the device (UE) position.

RTT operates by sending a ranging signal and measuring the passing time until the reply, denoted $t_{reply}$, from the other ranging object occurred. By measuring the travel time $t_{round}$ of the signal, a distance between the two objects may be estimated. RTT can be expressed as shown below, where $t_p$ is the signal time of flight:

$$t_{round}=2t_p+t_{reply}$$

From $t_p$ the distance between the two ranging devices is determined by:

$$\text{range}(m) = t_p(s) \cdot v\left(\frac{m}{s}\right)$$

Figure 1:
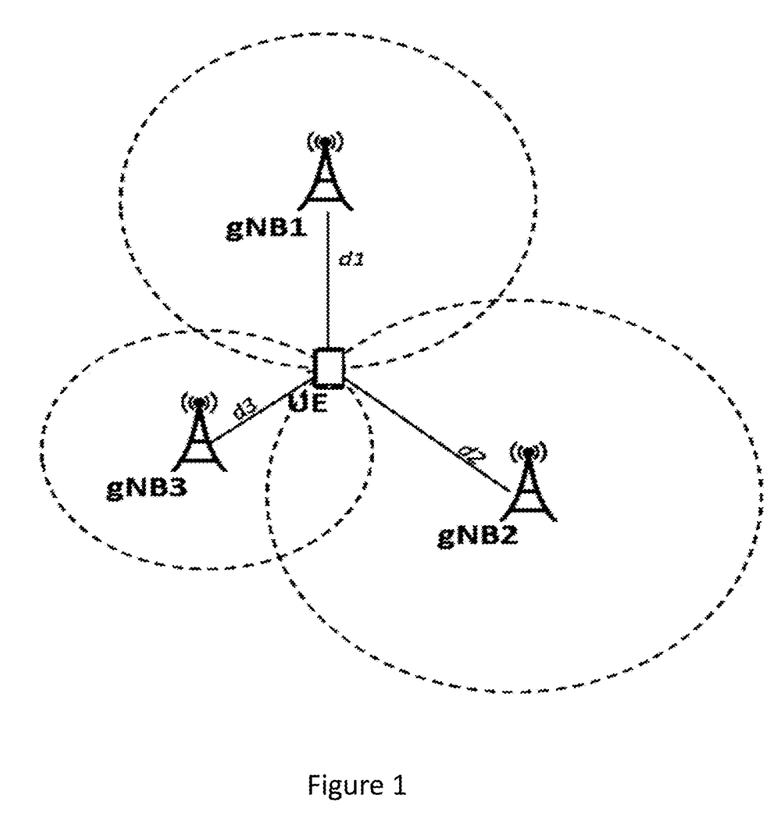
FIG. 1 schematically illustrates positioning via triangulation using three RTT measurements.

FIG. 1 illustrates a scenario including 3 gNBs, gNB1-gNB3 and one UE and different distances between the UE and respective gNB are shown and denoted d1, d2, d3. Positioning may be performed via the trilateration of three RTT measurements using the scenario of FIG. 1.

ECID TA Type 1 Procedure

In LTE, the RTT procedure may be performed using the procedure known as Timing Advance type1 or TADV type1, disclosed in 3GPP TS 36.305 V15.1.0 (2018-09). A location server and serving eNB or serving gNB configures the UL and DL Radio Resource Control (RRC) measurements as shown for one configuration in FIG. 2 that illustrates the EICD procedure in LTE (TADV type 1)

Figure 2:
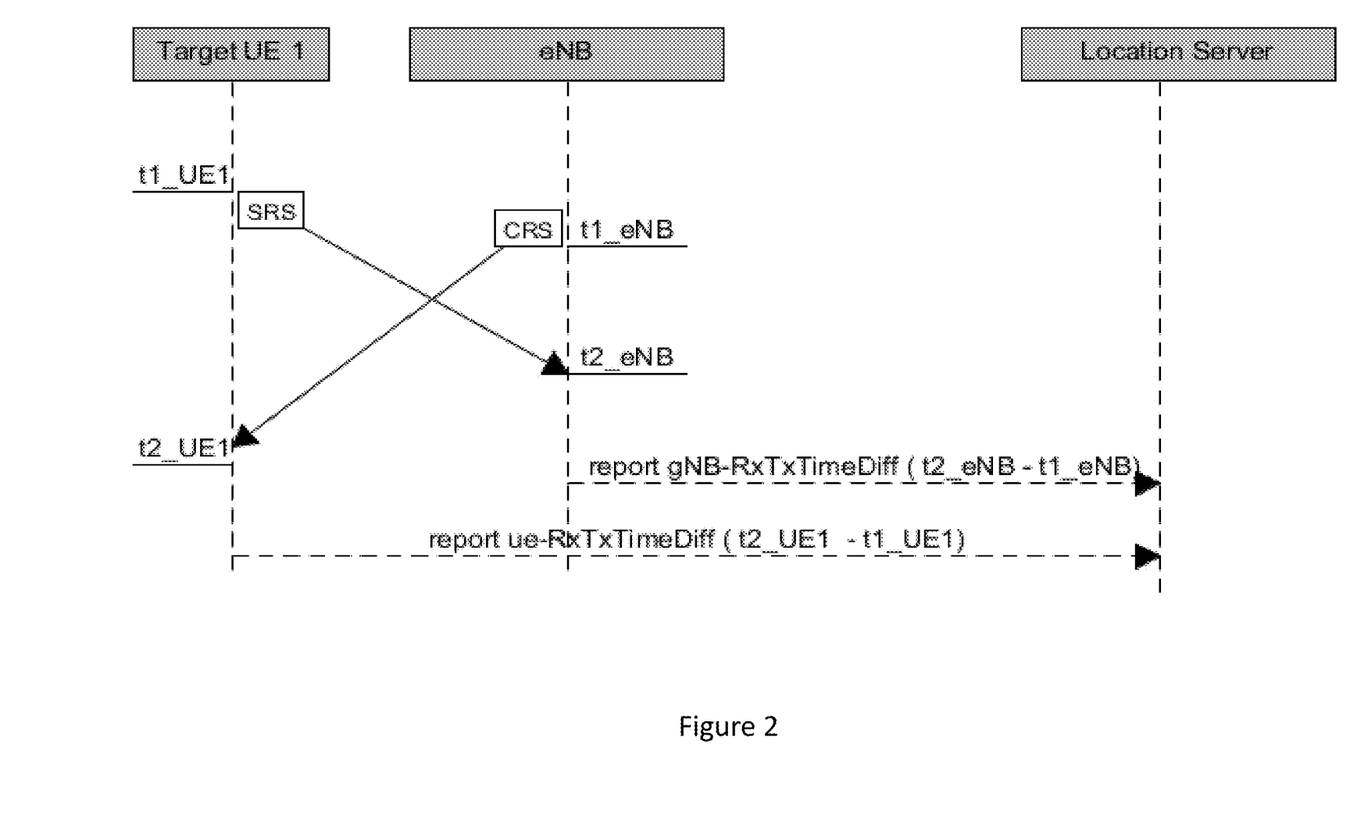
FIG. 2 schematically illustrates ECID procedure in LTE (Timing Advance type 1).

Between the eNB and Target UE1, UE1 measures the time difference:

$$Rx(UE-eNB)-Tx(UE-eNB)=t_{2\_UE1}-t_{1\_UE1}$$

Similarly, the eNB or gNB measures the time difference $$Rx(eNB)-Tx(UE-eNB)=t_{2\_eNB}-t_{1\_eNB}$$

By rearranging the two differences, the location server or Location Measurement/management Function (LMF) may determine the RTT as:

$$2t_p=(t_{2\_eNB}-t_{1\_UE1})+(t_{2\_UE1}-t_{1\_eNB})$$

SRS stands for Sounding Reference Signal. SRS is being transmitted by a UE on the last symbol of a subframe. CRS stands for Cell Specific Reference Signal and is transmitted from a eNB or gNB.

As mentioned earlier, there are limitations with the known prior art:
(1) The UE needs to be connected with the neighboring gNBs (eNBs) to be assigned UL resources for transmitting and DL resources for measurements
(2) Extra measurement signaling when ranging with multiple base stations: Current E-CID procedure signaling has to be done one at a time for each UE or eNB
(3) ECID TADV procedure is limited by the accuracy due to the quantization (with the LTE sampling time) for the UE and eNB reporting (Rx-Tx reporting).
(4) Internal hardware delays adds extra error and compensation.

There is therefore a need for at least one solution that overcomes at least the drawbacks presented above.

SUMMARY

In view of the drawbacks disclosed earlier, there are provided methods and apparatuses for achieving at least the following technical effects and provide the following advantages:
reducing signaling overhead (for measurement and reporting) for ranging between multiple gNBs and/or ranging multiple devices An RTT device set as initiator that may trigger multiple responders groups with single measurement; whereby the responders reply (or report) the time based on the received initiator signal. In other words, an initiating RTT device can trigger multiple groups of responders with a single signaling frame; whereas the responders reply and report the time between the reception of the initiator signal and the transmission of the response.

Extending the current protocol to achieve the RTT accuracy to resolve the limitations of (1) and (2) described earlier: These are mainly resulting from transceiver delays and quantization reporting. The concept is to introduce the procedure that enables accurate ranging by identifying the device capability to measure, correct or to report the measurement over LPP (UE to gNB) or NRPPa (gNB to LMF).

According to an aspect, there is provided a method for RTT measurement procedure performed by a location server, LS, in a communication network, the network comprising at least one user equipment, UE, a serving radio base station, s-gNB, serving the UE, and a number of neighboring radio base stations, n-gNBs, the method comprising:
  identifying the n-gNBs, based on at least one report from the at least one UE, or from UE information based on at least one measurement performed by the s-gNB;
  initiating configuration by:
    acquiring capabilities of said at least one UE and capabilities from said gNBs,
    acquiring beam measurements for the s-gNB and n-gNBs from said at least one UE report or from UE information based on measurements performed by the s-gNB and the n-gNBs;
    informing said UE about resources for the s-gNB and the n-gNBs;
    setting one of the UEs or gNBs to an initiator, and setting the rest of the UEs and gNBs to responders; and
    providing initiator/responder frequency and time resources and group shared resources; and
  performing signaling and measurements by:
    associating at least one PRS signal from the initiator with receiving responders, wherein the PRS signal is an UL-PRS signal if the initiator is a UE, and a DL-RPS signal if the initiator is a gNB,
    the responders sending a PRS on the specified frequency and time resources;
    and measuring the timing information corresponding to the signal received from the initiator.

According to an embodiment, the n-gNB over the NRPPa (New Radio Positioning Protocol A) or the Xn interface is used for configuring the n-gNBs.

The Xn interface is configured to inter-connect gNBs that are connected to a 5G core network.

According to an embodiment, the method may comprise:
  configuring said initiator node to send an initiator signal to one or more responder nodes;
  replying, by said at least one responder node, after a defined reply time from the reception of the initiator signal;
  if the n-gNB as responder(s) receives the signal with sufficient quality, sending by n-gNB a DL signal to the UE for Time OF Arrival, TOA, measurements.

According to an embodiment, the method further comprising, performing correction signals, periodic measurements or on scheduled correction signals.

According to an embodiment, the method comprises:
  if one of the at least one responder node fails to reply or the reply information has low quality, requesting by the initiator or a location server new resources for measurements with adjustment to parameters including at least one of: transmit power, periodicity, signal duration or timing advance.

According to an embodiment, the method comprises estimating, by the UE, a position of the UE based on information received from the gNB or the location server, wherein the information includes a gNB reply time and/or a receiver transmitter, RxTx time difference and/or gNB coordinates.

According to an embodiment, the method comprises estimating by the location server a position of the UE based on information received from the UE at the server, wherein the information includes a gNB reply time and/or a receiver transmitter, RxTx time difference and/or UE transceiver delays.

According to an embodiment, the method comprises estimating, by the server, a position of the UE based on information received from the gNB, wherein the information includes a gNB reply time and/or a receiver transmitter, RxTx time difference and/or gNB coordinates and/or gNB transceiver delays.

According to another aspect there is provided a method performed by a UE for RTT measurement procedure in a communication network, the method comprising:
  in response to a request from a location server, transmitting beam measurements for a s-gNB and n-gNBs from a a UE report or in response to a request from said s-gNB, to a send UL signal based for measurements performed by the s-gNB and the n-gNBs;
  receiving, from said location server, information about DL resources for the s-gNB and the n-gNBs;
  receiving, from said location server, initiator/responder frequency and time resources and group shared resources, as described above;
  initiating the RTT measurement procedure by sending an UL-PRS signal to the s-gNB and n-gNBs
  receiving, from said location server, information about DL resources for the s-gNB and the n-gNBs;
  being set, by said location server, to an UE-Based or UE-Assisted mode;
  if said UE is in a UE-Based mode, acquiring information from said location server, wherein the information includes a gNB and/or a receiver transmitter, RxTx time difference and/or gNB coordinates and use this information to compute a UE position; and
  if said UE is in a UE-Assisted mode, sending a RxTx time differences to said location server corresponding to the configured DL resources from the gNBs.

According to another aspect there is provided a method performed by a UE the method comprising:
  being set, by said location server, to a responder or initiator;
  if said UE is an initiator, sending one or more UL-PRS signals to the configured gNBs, where at least one UL-PRS is received by more than one gNB; and reporting RxTx time difference to the location server; and if said UE is a responder, responding to a DL-PRS sending an UL-PRS, where at least one UL-PRS is received by one or more gNBs; and reporting RxTx time difference to the location server.

According to another aspect, there is provided a method performed by a responder node being a gNB or a UE, the method comprising:

transmitting a correction signal a defined time period after the transmission of a first responder message for range determination;

detecting time period between a ranging signal and the correction signal to its own time base, and configuring an initiator node to compensate for a clock offset in a range measurements mostly that of a UEs.

According to another aspect, there is provided a system for Round Trip Time, RTT, measurement procedure in a communication network, the system comprising at least one UE, at least one s-gNB and at number of neighboring radio base station, n-gNBs, the system being operative to perform any of the features of pending method claims 1-8.

According to another aspect, there is provided a UE comprising a processor and a memory, the memory containing instructions executable by the processor whereby the UE is operative to perform the subject-matter of at least pending claim 9.

According to another aspect, there is provided a gNB or a UE comprising a processor and a memory, the memory containing instructions executable by the processor whereby the gNB of UE is operative to perform the subject-matter of a responder node according to pending claim 10.

BRIEF DESCRIPTION OF THE DRAWINGS

The present disclosure will now be described, for exemplary purposes, in more detail by way of embodiment(s) and with reference to the enclosed drawings, in which.

DETAILED DESCRIPTION

In the following, in several scenarios, a detailed description is presented of the exemplary embodiments in conjunction with the accompanying drawings to enable easier understanding of the solution(s) described herein.

Example of a measurement procedure will now be described and the main features may be summarized as follows:

A UE (or a Target UE) is configured to communicate with a serving gNB (s-gNB);

The s-gNB and at least one n-gNB may communicate via e.g. the Xn interface or over NRPPa when/if the communication is controlled or orchestrated by a Location Measurement Function (LMF) or a Location Server (LS) which may reside in a network node, in the core network node or any suitable network node;

Said at least one n-gNB is configured or is armed (via a backbone network) to receive at least one signal used for measurements send by the Target UE and said at least one g-NB is configured to estimate the Time of Arrival.

The Xn interface is configured to inter-connect gNBs that are connected to a 5G core network.

NRPPa is a New Radio Positioning Protocol A in 5G.

The NRPPa protocol may provide the following functions:

E-CID Location Information Transfer. This function allows the NG-RAN (Next Generation Radio Access Network) node to exchange location information with the LMF for the purpose of E-CID positioning. The Next Generation Radio Access Network is part of the 3GPP 5G NextGen System.

OTDOA (Observed Time Difference of Arrival) Information Transfer. This function allows the NG-RAN node to exchange information with the LMF for the purpose of OTDOA positioning.

Reporting of General Error Situations. This function allows reporting of general error situations.

As previously described one goal of the embodiments of the present disclosure is to minimize the signaling overhead from the ECID procedure. The signaling may be split or divided into signaling-resources used for measurement (like SRS for Uplink) and resources used for access and reporting (e.g. the payload data).

This process is relevant for the overhead and for the performance:

As an example, for the measurement the required SINR may be much lower than the SINR required for reporting. Hence an RTT procedure may be performed between more gNBs than in the ECID case.

According to some embodiments herein, the following exemplary steps demonstrate the procedure in order to maintain the accuracy of an RTT procedure, but at the same time minimize the signaling overhead. Note that the procedure below is just an example and the embodiments herein are not restricted to the exact ordering of the steps. Some steps may be obsolete and be omitted and/or additional steps may be added. The procedure below is presented for easier understanding some embodiments herein employing the teaching of the present disclosure.

Figure 3:
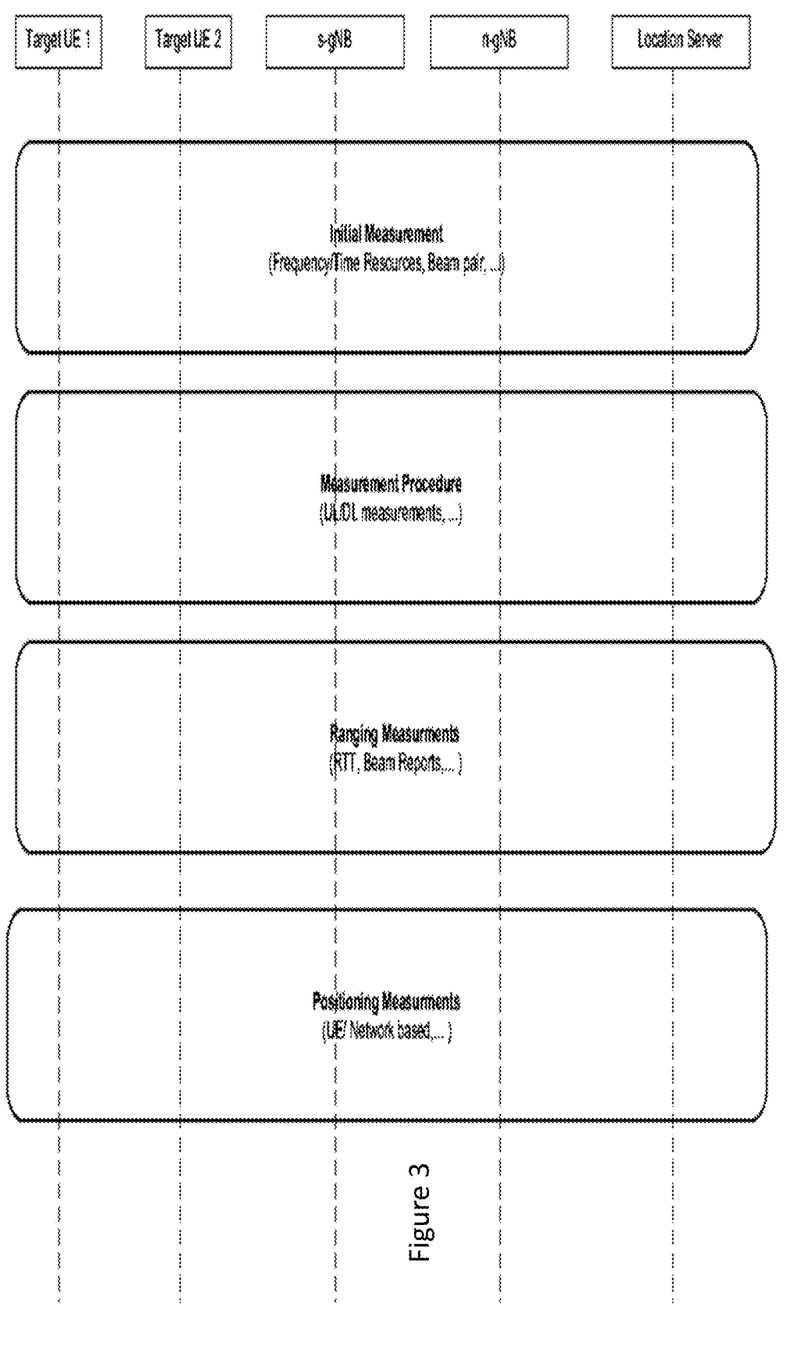
FIG. 3 schematically illustrates the overall RTT procedure.

The overall RTT procedure is schematically illustrated in FIG. 3. As shown, two target UEs, Target UE1 and Target UE2, are shown in addition to a serving base station (s-gNB) and one or more neighboring base stations (n-gNB). A location server is also illustrated. FIG. 3 also depicts different types of measurements that may be employed in the overall RTT procedure and which are explained below in accordance with some embodiments herein. The number of UEs and or gNBs and or servers of FIG. 3 is only an example.

It should be noted that the DL and UL NR (New Radio) positioning method based timing measurements (NR-RTT) may enable measurements with multiple gNBs and target at minimizing the signaling overhead in the E-CID procedure. The signaling resources can be split into signaling used for UL and DL measurements and signaling used for access and reporting. Minimizing the signaling overhead is needed in both cases to enable an efficient NR-RTT procedure that can be performed between multiple gNBs or multiple UEs.

The RTT overall procedure according to some embodiments herein will now be described.

I. Start Positioning Process:
  A. Optional: Get target service level (accuracy target)
II. Initial Measurements:
  A. Set positioning Mode:
    1. Ranging between a single UE and s-gNB
    2. Ranging between multiple UEs and s-gNB
    3. Ranging between multiple UEs and multiple gNBs
  B. Identify the n-gNBs based on UE SSB (Synchronization Signal Block) reports or from the coarse UE information based on the s-gNB initial measurements (ex. beam index or/and timing advance)
  C. Start configuration (initiate LPP, NRPPa)
    1. LMF or s-gNB configured to acquire UE(s) and gNB(s) capabilities
    2. UE is configured to report beam measurements for the n-gNBs from SSB report or CSI-RS report or a NR-PRS (NR positioning reference signal to be defined)
    3. Set the resources for the serving and neighboring gNBs
      a) LMF or s-gNB configures the n-gNB over NRPPa or Xn interface
      b) gNB(s) reserve/acknowledge the resources that are assigned in UL and DL for positioning
      c) s-gNB configures the RRC measurements with the target UE(s):
        Set UE or gNBs as initiator and responder
        Specify Initiator/Responder frequency and time resources and group shared resources
III. Measurement Signaling Procedure:
  A. Initiator (UE/gNB) is configured to send to one or more responder nodes (gNB/UE). (Note: that a UE or a gNB may be called responders or responder nodes).
  B. Responder nodes reply after a defined reply time from the reception of the initiator signal
  C. If the n-gNB (as responder(s)) receives the signal with sufficient quality the n-gNB is configured to send a DL signal to the UE for TOA measurements:
    case 1: The resource are already allocated during the procedure for the n-gNB
    case 2: These resources are assigned on demand and coordinated between the s-gNB and n-gNB
  D. Perform optional additional correction signaling (periodic measurements or on scheduled correction signals)
  E. In case step III a set of responders did not reply or the reply information has low quality, the initiator or the server (e.g. location server) may request new resources for measurements with adjustment to parameters like transmit power, periodicity, signal duration or timing advance.
IV. Positioning/Ranging Measurements:
  A. UE-Based: signaling needed
    The information that may be signaled from the LMF (or Location Server) or gNB to the UE enables the UE to estimate its position: By UE based is meant the UE is capable of estimation of its position. The information acquired by the UE are exemplified in the below table.

| Information | UE-Based |
|---|---|
| gNB reply time or RxTx time difference | Yes |
| gNB transceiver delays | Yes |
| gNB coordinates | Yes |

B. UE-Assisted
    The information that may be signaled from the UE to the LMF (or LS)

| Information | UE-assisted |
|---|---|
| UE reply time or RxTx time difference | Yes |
| UE transceiver delays | Yes |

The information that may be signaled from the gNB to the LMF for UE assisted maybe:

| Information | UE-assisted |
|---|---|
| gNB reply time or RxTx time difference | Yes |
| gNB transceiver delays | Yes |
| gNB coordinates | Yes |

In the following the ranging measurement procedure will be described as further details to steps II and III in the above section. An advantage is to:
  minimize the RTT signaling overhead by making use of UL/DL reference signal from multiple devices.
Introducing Initiator and responder concept to RTT procedure
  a. Ranging Measurement
  Initiate RTT with UE UL Signal
At this point the UE is configured to have knowledge about the time and frequency resources for the UE to transmit and receive the ranging reference signal on. It should emphasized that most configurations should be obtained from initial measurements step according to some embodiments herein.

In an exemplary embodiment, the RTT positioning measurement procedure (III) may be initiated by a UE uplink signal. The reference signal may be the sounding reference signal (SRS) or a different defined UL ranging or positioning reference signal (RRS/PRS).

Beam Pair Assignments:
Based on beam pair measurements between the UE and gNBs; the UE may be configured to transmit the resources on one or more beams. The LMF or the gNB can decide for the beam sets that may be acquired by multiple UEs.
  M beam pairs may be selected to maximize the RSRP or SINR based on the SSB or CSI-RS beam report from the serving and neighbor gNBs to the UE, where M is equal to the number of UE<->gNB links.
  N beam pair (where N<M) may be selected so that the initiator or initiator node may communicate with more than one responder.

Figure 4:
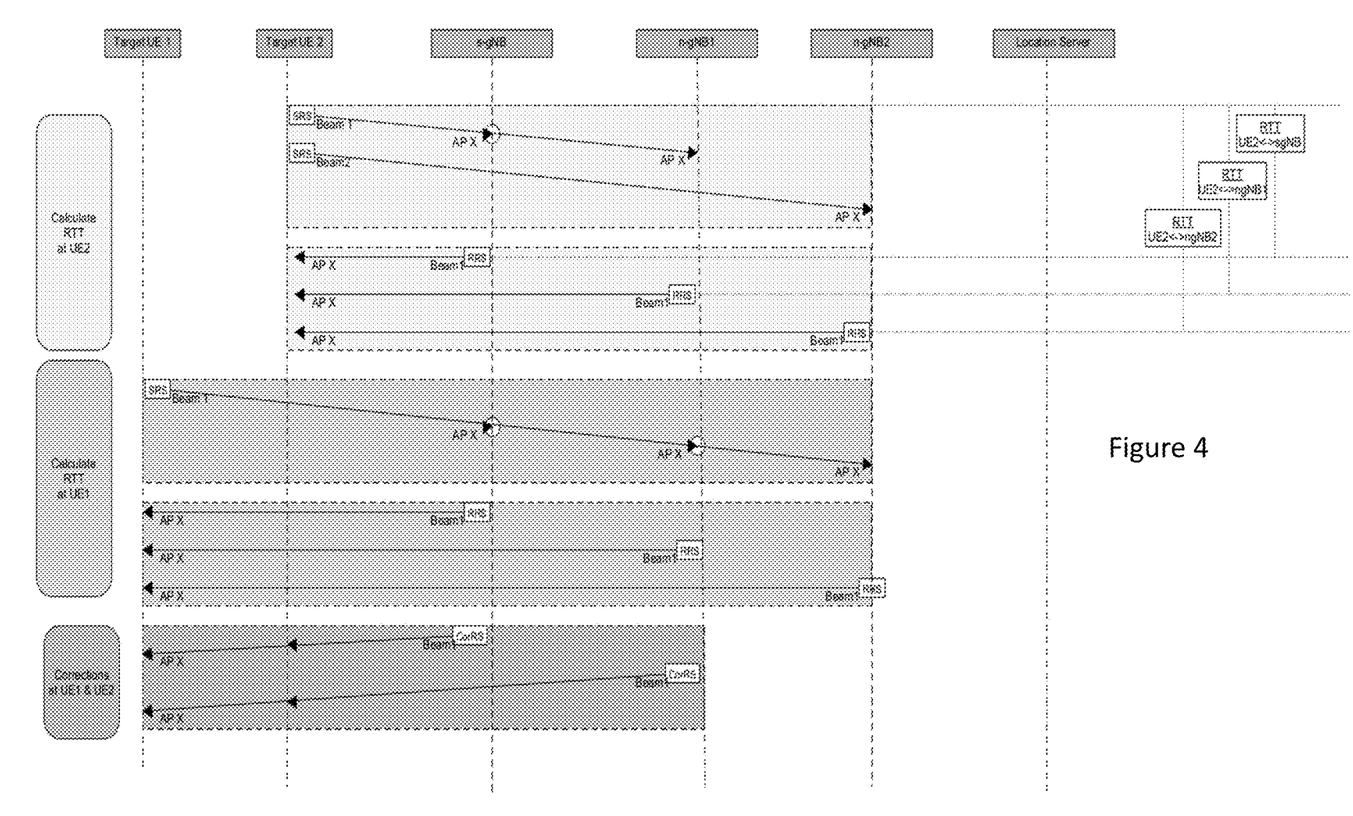
FIG. 4 schematically illustrates the NR RTT procedure between multiple UEs and multiple gNBs; UE as RTT initiator in a system according to some embodiments herein.

For the procedure in FIG. 4, describing a NR RTT procedure between multiple UEs and multiple gNBs is presented in a system, according to some embodiments herein. It is assumed in this exemplary scenario that the target UE1 is the RTT initiator node.

Target UE1 is scheduled to transmit a single uplink reference signal to the three gNBs (s-gNB, n-gNB 1 and n-gNB 2). The UL signal (SRS in this example) will be received at the gNBs at different times relative to the distance separating Target UE1 and each gNB. This approach may be attractive since Target UE1 may have limited resources w.r.t. antennas to perform beamforming and the reference signal is received by multiple gNBs. Compared with traditional RTT, the UL resources are minimized in this step to one instead of K signals (to the K gNBs).

The gNBs are configured to reply a UE specific signal, at a defined (known) reply time relative to a received SRS signal. The initiator (Target UE1) after this step may compute the distance or report the Time of Arrival (ToA) information to the location server (or LMF). Target UE2 may follow the same procedure, however in this case n-gNB2 cannot be addressed with the same beam to all gNBs. A second reference signal is hence needed with better beam characteristics to be received at the/with n-gNB2.

Broadcast Correction Signal for Multiple Signals to a Set of UEs

A periodic signal from the initiator node or a reflector node may be desired for the RTT procedure in order to compensate for clock oscillator offsets and drifts in order to increase the reliability of the measurements. The responder node is configured to transmit the correction signal a defined time period after the transmission of the first responder message for range determination.

By comparing the detected time period between the ranging signal and the correction signal to its own time base, the initiator node may be configured to compensate for the clock offset in the range measurements mostly that of the target UE. The clock oscillator of general gNBs may be regarded very accurate compared to that of UEs (this may be untrue for cheaper, small gNBs, e.g. for indoors). We assume here that the clock oscillator are more accurate but the embodiments herein are applicable even if said clock oscillators are not accurate compared to that of UEs.

Extra signaling is spared or minimized if the correction signal may also be broadcasted to multiple UEs as shown in FIG. 4 (see Corrections at UE1 and UE2 in FIG. 4). The correction reference signal (denoted here CorrRS) may be instantiated by positioning reference signals (PRSs) or by other non-UE specific signaling like the SSB or CSI-RS. As a pre-requirement, the node that processes the ranges should know the exact time difference of the transmission of RRS and CorrRS.

Initiate RTT with gNB DL Signal

The procedure above may also be initiated by a serving or neighboring gNB, where the gNBs are scheduled for initiating the range measurements by the serving gNB, the LMF or the UE (via the serving NB for UE based positioning). The gNB may be configured to send one or more reference signals that may be received by multiple UEs (e.g. UE1 and UE2, etc.) and the addressed UEs may act as responders or responder nodes. This approach minimizes uplink interference since the signaling to n-gNB can be configured with the optimum power and timing advance setting dedicate to the neighbor gNBs: If e.g. a Target UE sends UL reference signals specifically to a n-gNB, the n-gNB may request from the s-gNB to regulate (adjust) the timing offset with TA values accordingly.

Figure 5:
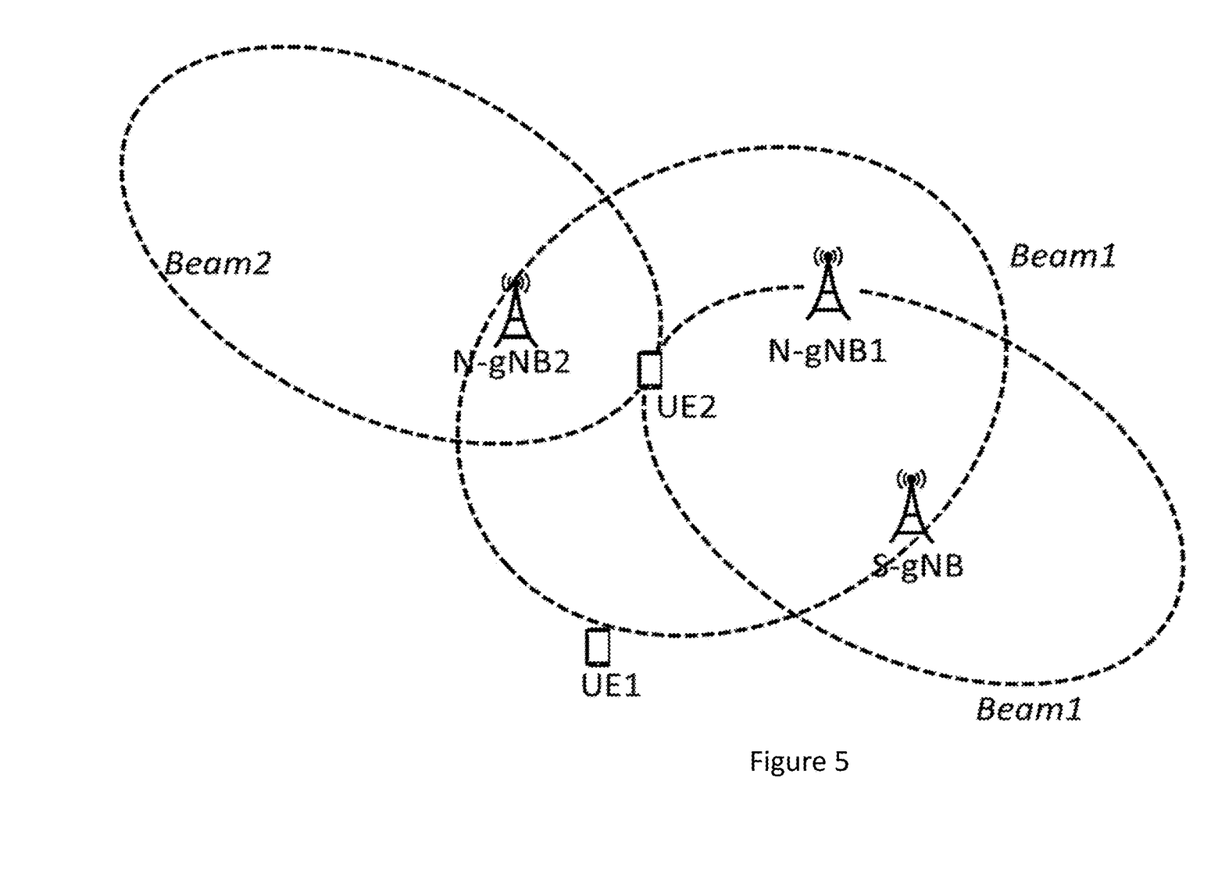
FIG. 5 illustrates an exemplary scenario wherein embodiments herein may be employed.

FIG. 5 illustrates the scenario for the example of FIG. 4, wherein 2UEs, 3 gNBs, and beams are depicted.

Figure 6:
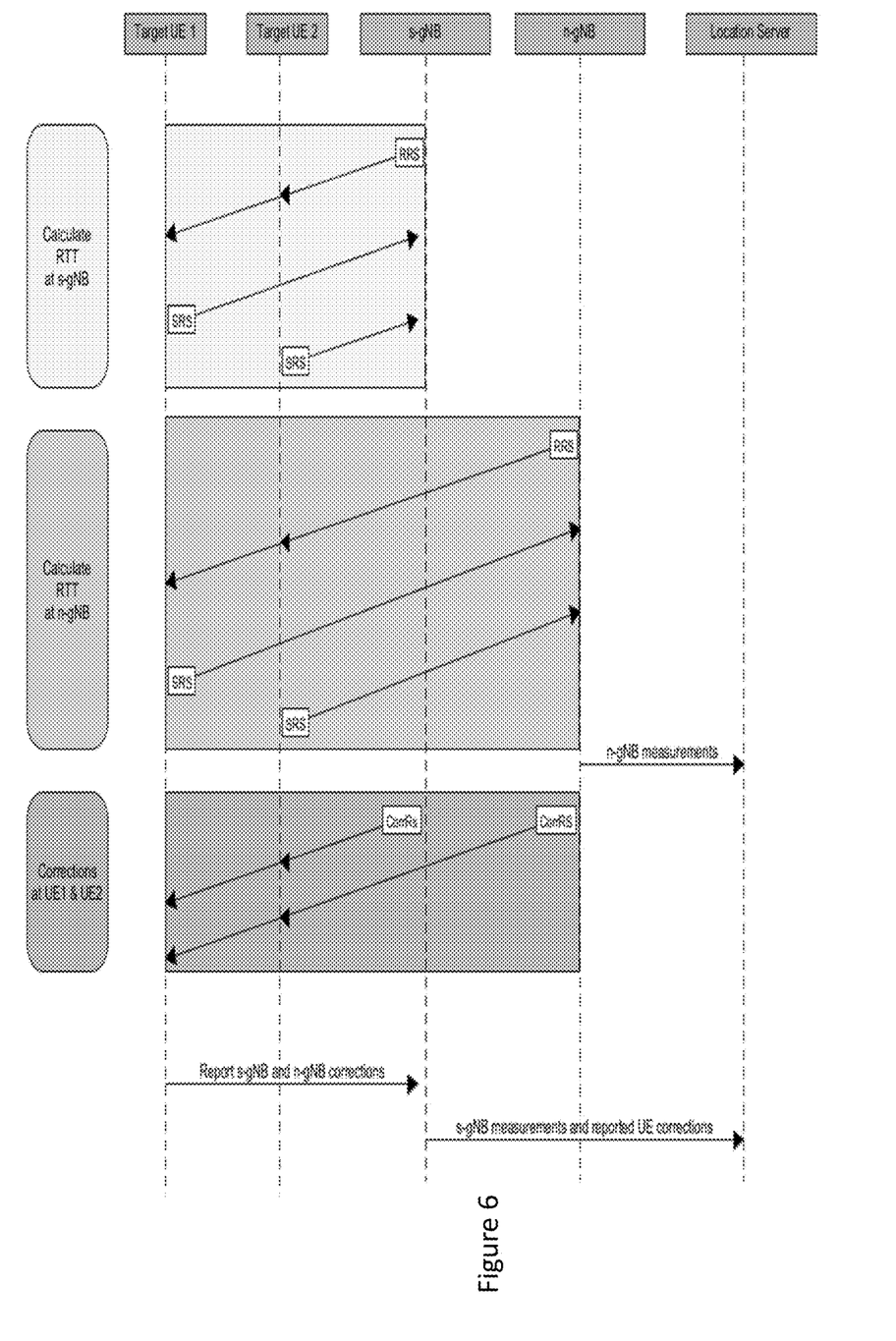
FIG. 6 illustrates a gNB initiated RTT signaling.

FIG. 6 illustrates an example of a gNB initiated RTT signaling.

In the following and according to some exemplary embodiments features will be described without restricting the scope of the presently described exemplary embodiments.

Power Control for UL Signals:

In normal operation, the UE is configured to transmit power (open loop mode) in LTE and 5G and said power is determined based on the pathloss (PL) estimated from the serving gNB to UE link, according to the following equation:

$$P_{UL} = \min\{P_{CMAX}, \text{received power target} + PL\}$$

For RTT or UTDOA with multiple gNBs, the UE power may not be sufficient for the K n-gNB(s), where K may take any number e.g. 1, 2, 3, . . . K If the UE does not possess or employ multi-antenna capabilities or if the channel quality to certain gNBs is not good or satisfactory, the following may apply:

The UE may be configured to transmit on defined resources or defined resources with higher power levels, without limiting power control to the serving cell (serving radio base station or s-gNB) only. In this case the transmit power for the UL-RRS (UpLink Reservation Reference Signal), UL-PRS or SRS may be defined by:

$$P_{UL} = \min\{P_{CMAX}, \max(P_{UL}(\text{gNB}(1:K)))\}$$

In case the UE is set as initiator and can transmit simultaneously over multiple panels or antenna ports: The K gNBs may be separated into groups ($K_1, \ldots K_N$) according to the UL reception quality:

$$P_{UL}(\text{panel1}) = \min\{P_{CMAX}, \max(P_{UL}(\text{gNB}(1:K_1)))\}$$

$$P_{UL}(\text{panelN}) = \min\{P_{CMAX}, \max(P_{UL}(\text{gNB}(1:K_N)))\}$$

b. Initial Measurements

This section focus on the RTT additional signaling or initial protocol extension needed in LPP [3].

The LMF may be configured to determine based on the requested service level for accuracy and latency:

Information on the UE capabilities

Configuration for reference signal parameters in DL and UL (Bandwidth, signal resources in time and frequency, periodic measurements)

Define the validity-time so that the RTT measurements are identified as valid

RTT in LPP Enhanced Protocol (TS 36.355 [3])

The LTE Positioning Protocol (LPP) defined in 3GPP Technical Specification TS 36.355, the message exchange between the Location Server and the target device (UE) for the RAT (Radio Access Technology) methods Observed Time Difference of Arrival (OTDOA) and eCID or RAT independent techniques like GNSS and WLAN. The extension of LPP for NR (New Radio) may extend the LPP to include messages for enabling RTT measurements.

UE Capabilities

Depending on the service level required, the LMF can request the following capabilities from the target device (or Target UE):

TOA Subsample Estimation

In RTT the responder node is configured to send the reply at a defined time (in Tc samples, where Tc is a design timing parameter) after the reception of the signal transmitted from the initiator.

In case the UE was the initiator node, if the UE can estimate the TOA using state of the art methods like interpolation or advanced detection methods, the UE is configured to know through signaling an information element denoted "TOA subsample accuracy estimation" that the quantization error can be corrected. The UE can either be configured to report this correction to the LMF that compensates for the error in the recorded RTT measurements, or, the UE is configured to compensate for the subsample correction in the detected reply time by adding or subtracting a phase delay equivalent to the correction. If the UE can perform the correction, it informs the LMF with its capability. If the measuring UE has not been applied the correction it may inform the LMF via a field or flag in the measurement report message: RTT-TargetDeviceError-Causes. The flag may be provided in a similar fashion to the LPP:ECIDErrorcause information field.

```
RTT-TargetDeviceErrorCauses : := SEQUENCE {
cause ENUMERATED {
undefined,
requestedMeasurementNotAvailable,
notAllrequestedMeasurementsPossible,
... },
```

-continued

```
rttMeasurementNotPossible NULL OPTIONAL,
rttCorrectionNotPossible NULL OPTIONAL,
... }
```

The code or algorithm shown above depicts RTT Provide Error sources to the LMF over LPP (coarse highlighted are new and may be included in the LPP [3]. These highlighted in include:
RTT-TargetDeviceErrorCauses
rttMeasurementNotPossible NULL OPTIONAL,
rttCorrectionNotPossible NULL OPTIONAL,
Transceiver Delays:

The components in the transceiver chain like filters, amplifiers and transmission lines add additional delay to the signal, making calibration necessary before exact measurements may be evaluated. Note that a calibration error of 1 ns (nanosecond) translates to a one-way distance error of 30 cm. The delay for a gNB varies greatly between different architectures, different deployments with the various antenna to RF (Radio Frequency) frontend connection options and the hardware specific delay for devices from different components (mixer, filter, amplifiers, ADC, . . . ).

One method common calibration way is achieved by measuring the distance at a known position or directly feeding the signal from the transmitter chain of the gNB through its own receiver chain in order to calculate the timing offset.

The timing offset may be measured (in advance) in an offline sessions with varying influencing parameters like the temperature and the operating frequency. Then the ranging device can compensate for the timing offset based on the information captured in the offline session. The delay may also be measured if the receiver of the same device can estimate the time traveled of the transmitted signal from the transmitter port to the receiver port. This approach may be applied in the case of full duplex or if a part of the transmitted signal can be recovered from the RF Tx-Rx switch in the case of half duplex [1].

In either cases, for high accuracy (high service levels) it is important that the transceiver delays are determined from both ranging devices. The transceiver delays may be reported from the responder (UE or gNB) to the node that measures the range like the initiator node (which can be the UE or gNB) or to the LMF over the LPP and/or NRPPa protocols.

The LMF may be configured to request the ranging device, for example a UE or gNB, to report the transceiver delay in samples (Tc) and correct the subsamples accordingly if the device has this capability. Below shows RTT wherein UE capabilities are provided to the LMF over LPP as an example.

```
RTT-ProvideCapabilities : :=      SEQUENCE {
SubsampleEstimation               ENUMERATED { supported }
OPTIONAL,
SubsampleCorrection               ENUMERATED { supported }
OPTIONAL,
TransceiverDelays                 ENUMERATED{ supported } OPTIONAL
...
}
```

Below also shows RTT wherein UE capabilities are provided to the LMF over LPP as an example.

```
RTT-Measurements : :=    SEQUENCE {
  transceiverDelaysFR1   0-4096 -- value in 'Tc' OPTIONAL
  transceiverDelaysFR2   0-4096 --value in 'Tc' OPTIONAL
  }
```

Figure 7:
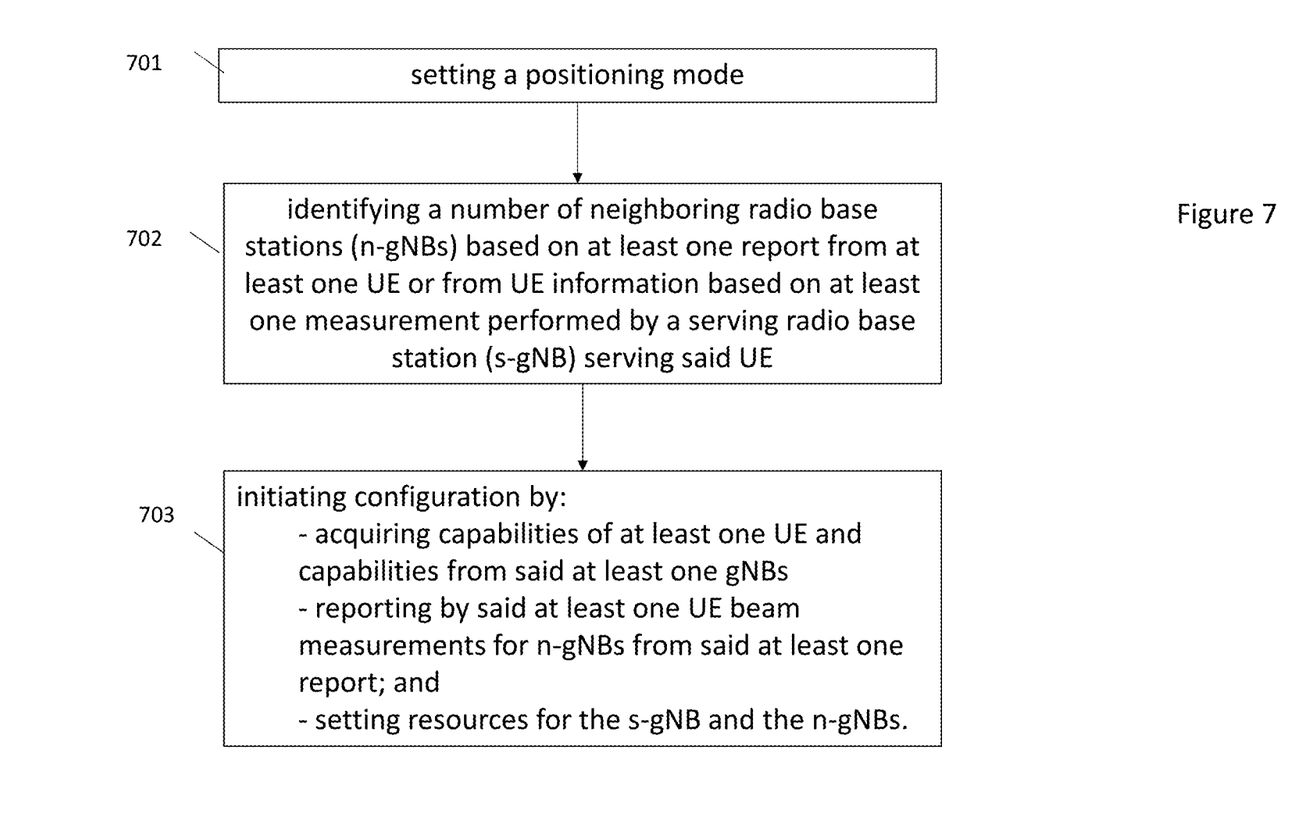
FIG. 7 illustrates a flowchart of a method according to exemplary embodiments herein.

Referring to FIG. 7, there is provided a flowchart of a method according to some embodiments herein. The method for RTT measurement procedure in a communication network, the method comprising:

(701) setting a positioning mode; (which may include ranging between a single UE and s-gNB; ranging between multiple UEs and the s-gNB and/or ranging between multiple UEs and multiple gNBs. Note that the mode that is selected or set is based on the scenario or the network topology wherein embodiments herein may be employed);

(702) identifying a number of neighboring radio base station, n-gNBs, based on at least one report from at least one User Equipment, or from UE information based on at least one measurement performed by a serving radio base station, s-gNB, serving said UE;

(703) initiating configuration by:
acquiring capabilities of said at least one UE and capabilities from said radio base stations, gNBs,
reporting by said at least one UE beam measurements for the n-gNBs from said at least one report; and
setting resources for the s-gNB and the n-gNBs.

According to an embodiment and as previously described, setting resources for the s-gNB and the n-gNB comprises:
configuring the n-gNB over the NRPPa or the Xn interface;
gNB(s) reserving the resources that are assigned in UL and DL for positioning
s-gNB configuring the Radio Resource Control, RRC, measurements with the said at least one UE by:

setting said at least one UE or said at least one gNB as initiator node and responder node; and specifying initiator node/Responder node frequency and time resources and group shared resources.

According to an embodiment and as previously described, the method may comprise:

configuring said initiator node to send an initiator signal to one or more responder nodes;

replying, by said at least one responder node, after a defined reply time from the reception of the initiator signal;

if the n-gNB (as responder(s)) receives the signal with sufficient quality, sending by n-gNB a DL signal to the UE for Time OF Arrival, TOA, measurements.

According to an embodiment, the method further comprising, performing correction signals, periodic measurements or on scheduled correction signals.

According to an embodiment, the method comprises:

if at least one responder node fails to reply or the reply information has low quality, requesting by the initiator or a location server new resources for measurements with adjustment to parameters including at least one of: transmit power, periodicity, signal duration or timing advance.

According to an embodiment, the method comprises estimating, by the UE, a position of the UE based on information received from the gNB or the location server, wherein the information includes a gNB reply time and/or a receiver transmitter, RxTx time difference and/or gNB coordinates.

According to an embodiment, the method comprises estimating by the location server a position of the UE based on information received from the UE at the server, wherein the information includes a gNB reply time and/or a receiver transmitter, RxTx time difference and/or UE transceiver delays.

According to an embodiment, the method comprises estimating, by the server, a position of the UE based on information received from the gNB, wherein the information includes a gNB reply time and/or a receiver transmitter, RxTx time difference and/or gNB coordinates and/or gNB transceiver delays.

According to another aspect there is provided a method performed by a UE for RTT measurement procedure in a communication network as previously described, wherein the UE has knowledge about time and frequency resources for the UE to transmit and receive a ranging reference signal, the method comprising:

initiating the RTT measurement procedure by sending an UL signal, transmitting resources on one or more beams.

According to another aspect, there is provided a method performed by a responder node being a gNB, a UE or a location server, the method comprising:

transmitting a correction signal a defined time period after the transmission of a first responder message for range determination;

detecting a time period between a ranging signal and the correction signal to its own time base, and configuring an initiator node to compensate for a clock offset in a range measurements mostly that of the UEs.

According to another aspect, there is provided as previously described system for Round Trip Time, RTT, measurement procedure in a communication network, the system comprising at least one UE, at least one s-gNB and at number of neighboring radio base station, n-gNBs, the system being operative to perform any of the features of pending method claims 1-8.

According to another aspect, there is provided a UE comprising a processor and a memory, said memory containing instructions executable by said processor whereby said UE is operative to perform the subject-matter of at least pending claim 9.

According to another aspect, there is provided a responder node being a gNB, a UE or a location server comprising a processor and a memory, said memory containing instructions executable by said processor whereby said responder node is operative to perform the subject-matter of at least pending claim 10.

There is also provided an initiator node according to previously described embodiments. In order to perform the previously described process or method steps related, the UE or gNB or location server comprises a processor or processing circuit or a processing module or a processor or means; a receiver circuit or receiver module; a transmitter circuit or transmitter module; a memory module a transceiver circuit or transceiver module which may include the transmitter circuit and the receiver circuit. The UE may further comprises an antenna system which includes antenna circuitry for transmitting and receiving signals to/from at least the UE or to/from gNBs or to/from LMFs.

The UE, gNB or location server may belong to any radio access technology including 2G, 3G, 4G or LTE, LTE-A, 5G, WLAN, and WiMax etc.

The processing module/circuit includes a processor, microprocessor, an application specific integrated circuit (ASIC), field programmable gate array (FPGA), or the like, and may be referred to as the "processor." The processor controls the operation of the UE, gNB or server and its components. Memory (circuit or module) includes a random access memory (RAM), a read only memory (ROM), and/or another type of memory to store data and instructions that may be used by processor. In general, it will be understood that the UE, gNB or server in one or more embodiments includes fixed or programmed circuitry that is configured to carry out the operations in any of the embodiments disclosed herein.

In at least one such example, the UE, gNB or server includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including anyone of method steps already described including the pending claims. Further, it will be appreciated that the UE, gNB or server may comprise additional components.

There is also provided a computer program comprising instructions which when executed on at least one processor of the UE, gNB or server, cause the at least said one processor to carry out the method according to at least the corresponding pending claims.

There is also provided a computer program comprising instructions which when executed on at least one processor of the system according to claim 11, cause the at least said one processor to carry out the method according to at least claims 1-8.

Several technical effects are achieved as demonstrated and the embodiments herein provide at least the following advantages:

reducing signaling overhead (for measurement and reporting) for ranging between multiple gNBs and/or ranging multiple devices An RTT device set as initiator that may trigger multiple responders groups with single measurement; whereby the responders reply (or report) the time based on the received initiator signal Extending the current protocol to achieve the RTT accuracy to resolve the limitations of (1) and (2) described earlier: These are mainly resulting from transceiver delays and quantization reporting. The concept is to introduce the procedure that enables accurate ranging by identifying the device capability to measure, correct or to report the measurement over LPP (UE to gNB) or NRPPa (gNB to LMF).

Throughout this disclosure both the term "location management function (LMF)" and the term "location server (LS)" is used. The skilled person understand that network unit in a communications network can function as a location server, or can include a location management function. The claims use the term location server, LS, and it is understood that any unit with a location management function, LMF, can function as a location server.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, satellite communications, TV broadcasting etc.

REFERENCES

[1] 3GPP TS 38.211, "Physical channels and modulation (Release 15)," 3rd Generation Partnership Project; Technical Specification Group Radio Access Network, Version 15.3.0, September 2018.
[2] 3GPP TS 36.355, "Evolved Universal Terrestrial Radio Access (E-UTRA); LTE Positioning Protocol (LPP)", V15.1.0 (2018-09)
[1] 3GPP TS 38.455, "NG-RAN; NR Positioning Protocol A (NRPPa)," V15.1.0 (2018-09)

The invention claimed is:

1. A method for a Round Trip Time measurement, the method comprising:
    identifying a neighboring radio base stations based on at least one report from the at least one user equipment(s) or from user equipment information, wherein the user equipment information is based on at least one measurement performed by a serving radio base station;
    initiating a configuration, the initiating comprising:
        acquiring capabilities of the at least one user equipment(s) and capabilities from the neighboring radio base stations and the serving radio base station;
        acquiring beam measurements for the serving radio base station and the neighboring radio base stations from the at least one user equipment report from the at least one user equipment(s) or from the user equipment information;
        informing the at least one user equipment(s) about resources for the serving radio base station and the neighboring radio base stations;
        setting a first user equipment of the at least one user equipment(s) or a first base station of the neighboring radio base stations and the serving radio base station to an initiator,
            wherein the at least one user equipment(s) have second portion that does not include the first user equipment,
            wherein the neighboring radio base stations and the serving radio base station has a third portion that does not include the first base station,
        setting the second portion and the third portion to responders; and
    providing initiator/responder frequency resources, initiator/responder time resources and group shared resources; and
    associating at least one positioning reference signal from the initiator with the responders,
        wherein the positioning reference signal is an Uplink positioning reference signal if the initiator is the first user equipment,
        wherein the positioning reference signal is a Downlink positioning reference signal if the initiator is the first base station;
    receiving from at least one of the responders a positioning reference signal on the initiator/responder frequency resources and initiator/responder time resources; and
    measuring the timing information corresponding to the signal received from the initiator.

2. The method according to claim 1, further comprising configuring the neighboring radio base stations using a New Radio Positioning Protocol A or the new interface, wherein the new interface is between Radio Access Networks.

3. The method according to claim 1, further comprising:
    configuring the initiator so as to send an initiator signal to at least one of the responders wherein the at least one responder node replies after a defined reply time; and
    sending a Downlink signal to the user equipment(s) for Time Of Arrival measurements when the neighboring radio base stations is the at least one of the responders and receives the signal.

4. The method according to claim 3, further comprising:
    receiving correction signals from the at least one of the responders; and
    performing, corrections according to the correction signals on periodic measurements or on scheduled correction signals.

5. The method according to claim 3, further comprising requesting new resources for the Time Of Arrival measurements and an adjustment to parameters if the at least one of the responders fails to reply or the reply information has low quality, wherein the adjustment to parameters is selected form the group consisting of transmit power, periodicity, signal duration or timing advance.

6. The method according to claim 1,
    wherein the user equipment estimates a position of the user equipment based on information,
    wherein the information is selected form the group consisting of a base station reply time, a receiver transmitter time difference and base station gNB coordinates.

7. The method according to claim 1, further comprising estimating a position of the user equipment based on information received from the user equipment, wherein the information is selected form the group consisting of a base station reply time, a receiver transmitter time difference and user equipment transceiver delays.

8. The method according to claim 1, further comprising estimating a position of the user equipment based on information received from the gNB, wherein the information is selected form the group consisting of a base station reply time, a receiver transmitter time difference, a base station coordinates and a base station transceiver delays.

9. A device comprising:
a processor circuit and a memory circuit, wherein the memory is arranged to store instructions for the processor circuit,
wherein the processor circuit is arranged to identify, neighboring radio base stations, based on at least one report from the at least one user equipment, or from user equipment information based on at least one measurement performed by the serving radio base station
wherein the processor circuit is arranged to initiate a configuration, the initiating comprising:
wherein the processor circuit is arranged to acquire capabilities of the at least one user equipment and capabilities from the neighboring radio base stations and the serving radio base station,
wherein the processor circuit is arranged to acquire beam measurements for the serving radio base station and neighboring radio base stations from the at least one user equipment report or from user equipment information;
wherein the processor circuit is arranged to inform the user equipment about resources for the serving radio base station and the neighboring radio base stations;
wherein the processor circuit is arranged to set one of the said UEs or neighboring radio base stations and the serving radio base station to an initiator,
wherein the at least one user equipment(s) have second portion that does not include the first user equipment,
wherein the neighboring radio base stations and the serving radio base station has a third portion that does not include the first base station,
wherein the processor circuit is arranged to set the second portion UEs and the third portion to responders; and
wherein the processor circuit is arranged to provide initiator/responder frequency resources, initiator/responder time resources and group shared resources; and
wherein the processor circuit is arranged to associate at least one positioning reference signal signal from the initiator with the responders,
wherein the positioning reference signal is an Uplink positioning reference signal signal if the initiator is a user equipment,
wherein the positioning reference signal PRS is a Downlink positioning reference signal if the initiator is the first base station;
wherein the processor circuit is arranged to receive from the responders a positioning reference signal on the initiator/responder frequency resources and initiator/responder time resources; and
wherein the processor circuit is arranged to measure the timing information corresponding to the signal received from the initiator.

10. A method comprising:
identifying the neighboring radio base stations, based on at least one report from the at least one user equipment, or from user equipment information based on at least one measurement performed by the serving radio base station;
initiating configuration, the initiating comprising:
acquiring capabilities of the at least one user equipment and capabilities from the neighboring radio base stations and the serving radio base station;
acquiring beam measurements for the serving radio base station and neighboring radio base stations from the said at least one user equipment report or from user equipment information;
informing the at least one user equipment about resources for the serving radio base station and the neighboring radio base stations;
setting a first user equipment of the at least one user equipment or neighboring radio base stations and the serving radio base station to an initiator, wherein the at least one user equipment(s) have second portion that does not include the first user equipment,
wherein the neighboring radio base stations and the serving radio base station has a third portion that does not include the first base station;
setting the second portion UEs and the third portion to responders; and
providing initiator/responder frequency resources, initiator/responder time resources and group shared resources; and
associating at least one positioning reference signal from the initiator with the responders,
wherein the positioning reference signal is an Uplink positioning reference signal if the initiator is a user equipment,
wherein the positioning reference signal is a Downlink positioning reference signal if the initiator is the first base station;
receiving from at least one of the responders a positioning reference signal on the initiator/responder frequency resources and initiator/responder time resources; and
measuring the timing information corresponding to the signal received from the initiator.

11. A device comprising:
a processor circuit and a memory circuit, wherein the memory is arranged to store instructions for the processor circuit,
wherein the processor circuit is arranged to identify the neighboring radio base stations, based on at least one report from the at least one user equipment, or from user equipment information based on at least one measurement performed by the serving radio base station,
wherein the processor circuit is arranged to acquire capabilities of the at least one user equipment and capabilities from the neighboring radio base stations and the serving radio base station,
wherein the processor circuit is arranged to acquire acquiring beam measurements for the serving radio base station and neighboring radio base stations from the at least one user equipment report or from user equipment information,
wherein the processor circuit is arranged to inform the user equipment about resources for the serving radio base station and the neighboring radio base stations,
wherein the processor circuit is arranged to set a first user equipment of the at least one user equipment or neighboring radio base stations and the serving radio base station to an initiator, wherein the at least one user equipment(s) have second portion that does not include the first user equipment, wherein the neighboring radio base stations and the serving radio base station has a third portion that does not include the first base station, wherein the processor circuit is arranged to set the second portion UEs and the third portion to responders, wherein the processor circuit is arranged to provide initiator/responder frequency resources, initiator/responder time resources and group shared resources, wherein the processor circuit is arranged to associate at least one positioning reference signal from the initiator with the responders,     wherein the positioning reference signal is an Uplink positioning reference signal signal if the initiator is a user equipment,     wherein the positioning reference signal PRS is a Downlink positioning reference signal if the initiator is the first base station, wherein the processor circuit is arranged to receive from the responders a positioning reference signal on the initiator/responder frequency resources and initiator/responder time resources, wherein the processor circuit is arranged to measure the timing information corresponding to the signal received from the initiator.

\* \* \* \* \*